United States Patent [19]

Kalata et al.

[11] E Re. 29,320

[45] Reissued July 26, 1977

[54] NESTABLE CONTAINERS

[75] Inventors: Daniel R. Kalata, Smithtown, N.Y.; Henry H. Huston, Burlington, Vt.

[73] Assignee: Owens-Illinois, Inc., Toledo, Ohio

[21] Appl. No.: 440,141

[22] Filed: Feb. 6, 1974

Related U.S. Patent Documents

Reissue of:

[64] Patent No.: 3,347,411
Issued: Oct. 17, 1967
Appl. No.: 442,398
Filed: Mar. 24, 1965

U.S. Applications:

[63] Continuation of Ser. No. 302,780, Nov. 1, 1972, abandoned, which is a continuation of Ser. No. 827,437, March 26, 1969.

[51] Int. Cl.[2] ..... B65D 21/02

[52] U.S. Cl. ..... 206/519; 206/520; 229/1.5 B

[58] Field of Search ..... 220/97 C, 97 F; 229/1.5 B, 21; 206/515, 516, 517, 518, 519, 520

[56] References Cited

U.S. PATENT DOCUMENTS

| | | | |
|---|---|---|---|
| 2,988,258 | 6/1961 | Witzke | 220/97 X |
| 3,094,240 | 6/1963 | Wanderer | 206/519 |
| 3,139,213 | 6/1964 | Edwards | 206/519 |
| 3,288,340 | 11/1966 | Shapiro | 206/519 |
| 3,374,922 | 3/1968 | Shelby | 206/519 |

*Primary Examiner*—George E. Lowrance
*Attorney, Agent, or Firm*—Brooks, Haidt, Haffner & Delahunty

[57] ABSTRACT

A nestable container having a frusto conical downwardly tapering sidewall, and a bottom which includes a plurality of embossed lugs disposed towards the periphery and a portion lying inside the lugs which is embossed upwardly forming a surface on the interior of the container for engaging the lugs of and radially and axially restraining an upper nested container. In one form of the invention the upper end of the container has means for spacing it a predetermined distance from an adjacent container in a nested stack of containers.

10 Claims, 4 Drawing Figures

10
12
14
16
18
19
20
22
24
26
28
29
30
32
34
34a
36
38
38a
38b
40
42

NESTABLE CONTAINERS

Matter enclosed in heavy brackets [ ] appears in the original patent but forms no part of this reissue specification; matter printed in italics indicates the additions made by reissue.

*This is a continuation of application Ser. No. 302,780, filed Nov. 1, 1972, now abandoned, which was a continuation of application Ser. No. 827,437, filed Mar. 26, 1969, for reissue of U.S. Pat. No. 3,347,411.*

This invention relates to nestable containers and more particularly to containers made of thermoplastic material by vacuum forming. Containers constructed in accordance with the concept of this invention are particularly adapted, among other possible uses, for use in packaging certain consumer commodities such as ice cream, cottage cheese, various frozen foods, carry-out foods such as potato salad, and other foods or commodities.

In handling and dispensing plastic containers, it is desirable to prevent the containers from sticking together when placed in stacked formation and to facilitate mechanical separation and dispensing. It is further desirable to maintain lateral spacing between the sidewall of nested containers.

In essence, the present invention contemplates the provision of a nestable container having a plurality of embossed lugs disposed at the bottom thereof, which provide positive abutting engagement between the lower face of the lugs of an upper container with a cooperating surface of a lower container disposed in nested relationship. In one embodiment of the invention, the lower faces of the lugs are located substantially in the plane of the lower rim of the container and the lugs are disposed closely adjacent the lower rim. The area of the bottom lying inside of the lugs is embossed upwardly, thereby providing, on the interior of the container, a surface against which the lugs of an upper nested container may rest.

In one form of the invention the lip portion of the open end is provided with a configuration which is adapted to receive and hold thereon a closure of the plug type or of the snap-over type and such configuration serves the dual purpose of cooperating with the bottom lug arrangement to enhance the stacking arrangement.

It is an aim of the present invention to provide a new and improved container which prevents the containers from sticking together when placed in stacked formation. According to this invention, a stack of nested containers is characterized by a constant spacing of the outwardly extending lip flanges of one container with respect to the next adjacent container in order to facilitate accurate dispensing of individual containers. Further, according to this invention, the nested stacked arrangement is very compact so that a large quantity of containers may be contained in a small volumetric space for purposes of shipment or for purposes of dispensing same from a conventional dispensing machine.

Another aim of this invention resides in the provision of a new and improved container which provides substantially increased supporting surface between adjacent containers when such containers are in a nested stacked condition. That is, according to one form of this invention, the containers are constructed so that when two adjacent containers are in their nested stacked condition, the lower container supports the upper container by a lower contact means towards the bottom of the container and an upper contact means disposed towards the top of the container. Also, the improved container according to this invention avoids reliance upon wall thickness to prevent successive or full nesting of the containers when they are in stacked condition.

Further, it is an aim of the present invention to prevent cocking or tilting of the containers when they are in their nested condition. This is accomplished by means of the novel upper and lower supporting surfaces. Further, according to the present invention, means are provided which retain the sidewalls of adjacent containers in fixed, spaced relationship one with respect to the next when they are in nested condition. It is still another aim of the present invention to allow a stack of containers to be subjected to increased abuse or less handling care shipment thereof without causing injury or damage to the containers.

Moreover, a feature of the instant invention is the provision of a new and improved container having attributes which make it economical to manufacture, practical and reliable.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which this disclosure is based may readily be utilized as the basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein.

Figures 1, 2, 3, 4:
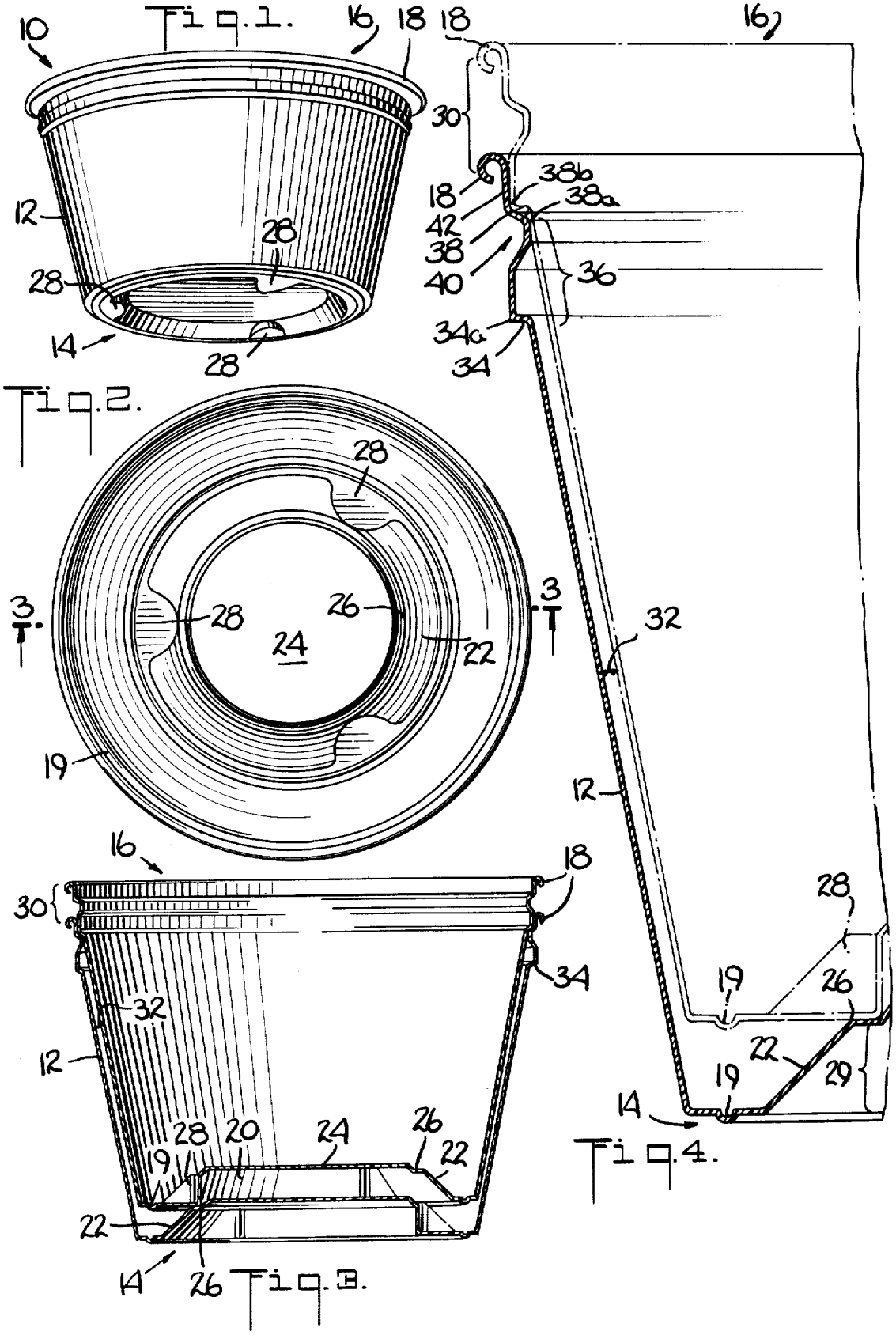
FIG. 1 is a perspective view of a container constructed in accordance with the concept of this invention.
FIG. 2 is a bottom plan view showing the embossed lugs disposed at the bottom of the container.
FIG. 3 is a sectional view taken along the line 3—3 of FIG. 2, but also showing a second container in nested relationship with respect to the first container.
FIG. 4 is an enlarged fragmentary longitudinal sectional view showing details of the interrelationship between two containers in nested-stacked condition.

In the illustrated embodiment of the invention, there is shown a container indicated generally at 10, FIG. 1, having a slightly tapered sidewall 12 extending upwardly from a bottom 14 at its small end to adjacent its open end 16 where it is provided with a lip 18. The lip 18 may take the form of a beaded edge, a rolled edge, or merely a straight upwardly extending flange, as desired.

As best seen in FIG. 3, a circumferential rib 19 is located in the bottom 14 of the container towards the outer diameter thereof for purposes of stiffening the bottom wall as well as providing a suitable base. The bottom 14 is recessed inwardly forming a truncated conical depression 20, FIG. 3, providing an upwardly, inwardly sloping sidewall 12, and terminating in an

[interiorally] *interiorly* disposed flat top surface 24. Interposed between the flat top surface 24 and the sloping sidewall 22 is a lug receiving shoulder 26, FIGS. 3 and 4, having a horizontal portion for receiving the bottoms of lugs 28, to be more particularly referred to below, and an upwardly extending inner wall portion for engagement with the inner portions of the lugs 28. This shoulder is substantially peripherally continuous and acts as a strengthening rib as well as a shelf-like surface against which the embossed lugs of an upper nested container may rest and be restrained from lateral movement.

The bottom 14 of the container further comprises a plurality, three being shown in the drawings, of spaced, semi-cylindrical shaped lugs 28, FIGS. 1–3, which extend downwardly, from about the location of the juncture between the sloping sidewalls 22 and the [interiorally] *interiorly* disposed flat top surface 24 of the depression 20, to the plane of the bottom end of the container. As best seen in FIGS. 1 and 2, the bottoms of the lugs are formed by radially inwardly extensions of the bottom end surface of the container, and the innermost location of the semi-cylindrically shaped vertical wall of each lug is within the zone of the sloping sidewall 22 so that the lugs may be regarded as being formed by interruptions thereof. It will be appreciated that the truncated conical depression 20 also serves to strengthen and reinforce the bottom of the container.

When a plurality of containers are nested in stacked condition, the bottom outside surfaces of the three semi-cylindrical shaped lugs 28 of one container register with the outwardly extending lug receiving shoulder 26, FIGS. 3 and 4, of the adjacent container therebelow, and thereby prevent the containers from being completely nested and stuck together. As seen in FIG. 4, the vertical distance 29, between the bottom of the lugs 28 and the top of the shoulder 26 is called the bottom stacking height. It will be appreciated that the engagement between the bottom of the lugs of one container and the truncated depression of one adjacent container, when in contact, serve to positively space the outwardly extending lip flanges 18, FIGS. 3 and 4, a constant fixed distance 30 apart one from the next adjacent one, such distance being equal to the bottom stacking height 29. It is also noted that preferably the three lugs 28 are disposed in spaced apart locations so that each container is axially aligned with respect to the next adjacent container and this alignment is maintained by the cooperative relationship of the lugs 28 and shoulder 26. This provides a slight spacing 32 between the sidewalls 12 of adjacent containers which is substantially uniform around each container. Such spacing is particularly useful when printing indicia on the container sidewall and the containers are stacked in nested condition before the printing is entirely dry, as well as to protect the printed surface.

As best seen in FIG. 4, the sidewall of the container adjacent its open end is provided with a peripherally continuous outwardly extending first shoulder 34 presenting a sharply defined outer edge. A substantially vertical neck 36 extends upwardly from the shoulder 34, and provided at its upper end is a peripherally continuous outwardly extending second shoulder 38 presenting a sharply defined inner edge. The outer diameter 34a (FIG. 4) of the first shoulder 34 is slightly greater than the inner diameter 38a (FIG. 4) of the second shoulder 38 and the outer diameter of the second shoulder 38b is substantially greater than the diameter 34a of the first shoulder 34.

The neck 36 extends substantially vertically and is provided with a peripherally inwardly projecting bead 40 (FIG. 4) towards the top thereof which serves to add rigidity to the container as well as to form the second shoulder 38. The second shoulder 38 has as its outer edge an upwardly extending portion 42 which serves to connect the shoulder to the lip 18, FIG. 4.

It will be seen from FIG. 4, the sharply defined outer edge of the first shoulder 34 and the sharply defined inner edge of the second shoulder 38 facilitate accurate engagement in register of successively nested containers. That is, the vertical distance between the shoulders 34 and 38, which equals the length of the neck 36, is called the top stacking height *and as shown in FIG. 4, the vertical distance between the second shoulder 38 and the top of the lip or rim 18 is less than the top stacking height.* If the respective shoulders of two adjacent containers engage, then the containers are spaced apart a distance equal to the top stacking height (neck length 36). The second shoulder 38 and the bead 40 serve the dual purpose of adding stiffness to the open top of the container and also are used for purposes of sealing a snap-on closure lid (not shown).

In the embodiment of the invention illustrated in FIGS. 3 and 4, upper contact is made between shoulders 34 and 38 simultaneously with the lower contact between the bottom of lugs 28 and the lug receiving shoulder 26. The combination of upper and lower contact provides increased supporting surface area so that a higher stack or greater axial force may be applied without jamming the containers. This is beneficial during transit as well as when the containers are in a dispensing machine. Further, the combination of upper and lower contact retains the containers in closer axial alignment, thereby preventing cocking or tilting while they are in a nested, stacked condition.

The embodiment of the container as herein described is made from a one-piece sheet of suitable plastic material.

It thus will be seen that the objects of this invention have been fully, effectively accomplished.

Although a particular embodiment of the invention is herein disclosed for purposes of explanation, various modifications thereof, after study of this specification, will be apparent to those skilled in the art to which the invention pertains, reference should accordingly be had to the appended claims in determining the scope of the invention.

What is claimed and desired to be secured by Letters Patent is:

1. A plastic nestable container comprising a sidewall tapering generally downwardly from a larger diameter adjacent its upper open end to a smaller diameter adjacent its bottom, said bottom being recessed inwardly forming a vertically disposed truncated conical depression having upwardly, inwardly sloping sidewalls with respect to the bottom, a plurality of spaced lugs extending upwardly from the bottom of said container, said lugs having semi-cylindrical shaped vertical walls forming interruptions of said sloping sidewalls of the truncated conical depression, a substantially peripherally continuous lug receiving shoulder interrupting said sloping sidewalls of the truncated conical depression, said lug receiving shoulder having a horizontal portion for receiving the bottom of the lugs and an upwardly extending inner wall portion for engagement with the semi-cylindrical shaped vertical walls of said lugs of an upper nested container.

2. A nestable container according to claim 1, wherein said embossed lugs are three lugs spaced equidistantly from the vertical axis of the container.

3. A nestable container comprising a sidewall and a bottom, said sidewall being generally frusto-conical tapering downwardly from a larger diameter adjacent its open end to a smaller diameter adjacent said bottom, means disposed adjacent said upper open end for spacing the upper open ends of a plurality of nested stacked containers a predetermined distance apart, respectively, said distance being defined as the top stacking height, said bottom being recessed inwardly, forming a vertically disposed concave conical depression having upwardly, inwardly sloping sidewalls, a plurality of spaced lugs extending upwardly from the bottom of said container, said lugs having semi-cylindrical shaped vertical walls forming interruptions of said sloping sidewalls of the conical depression, a substantially peripherally continuous lug receiving shoulder interrupting said sloping sidewall of the conical depression, said lug receiving shoulder having a horizontal portion for receiving the bottoms of the lugs of an upwardly extending inner wall portion for engagement with the semi-cylindrical shaped vertical walls of said lugs of an upper nested container, the vertical nesting distance between said lug receiving shoulder and the bottom of said lugs being defined as the bottom stacking height, and the bottom and top-stacking heights being substantially equal.

4. A nestable container according to claim 3, further comprising indicia disposed on the sidewall of said container.

5. A plastic nestable container having a slightly tapered sidewall extending upwardly from a bottom at its small end to adjacent its open end where it is provided with a peripherally continuous outwardly extending first shoulder presenting a sharply defined outer edge and a substantially vertical neck extending outwardly therefrom and provided at its upper end with a peripherally continuous outwardly extending second shoulder presenting a sharply defined inner edge, an inwardly extending annular bead forming the upper portion of said vertical neck adjacent said second shoulder, the outer diameter of the first shoulder being slightly greater than the inner diameter of said neck portion at said second shoulder and said second shoulder being of a diameter substantially greater than said first shoulder, the vertical distance between said first shoulder and said second shoulder being defined as the top stacking height, a plurality of embossed lugs disposed towards the periphery of said bottom, and the portion of the bottom lying inside the lugs being embossed upwardly forming a surface on the interior of the container for engaging the lugs of an upper nested container, the vertical nesting distance between the surface on the interior of said container and the bottom surface of said lugs being defined as the bottom stacking height, and said bottom stacking height being substantially equal to said top stacking height.

6. A plastic nestable container having a slightly tapered sidewall extending upwardly from a bottom at its small end to adjacent its open end where it is provided with a peripherally continuous outwardly extending first shoulder presenting a sharply defined outer edge and a substantially vertical neck extending upwardly therefrom and provided at its upper end with a peripherally continuous outwardly extending second shoulder presenting a sharply defined inner edge, the outer diameter of the first shoulder being slightly greater than the inner diameter of said neck portion at said second shoulder and said second shoulder being of a diameter substantially greater than said first shoulder, the vertical distance between the first shoulder and the second shoulder being defined as the top stacking height, said bottom being recessed inwardly by a truncated conical depression providing an upwardly, inwardly sloping sidewall and terminating in an [interiorally] *interiorly* disposed top surface, a plurality of spaced semi-cylindrical shaped lugs extending downwardly from about the location of the juncture between said sloping sidewall and the [interiorally] *interiorly* disposed top surface to the plane of the bottom, the bottoms of the lugs being formed by radially inward extensions of the bottom end surface of the container, and the innermost location of the semi-cylindrical shaped vertical wall of each lug being within the zone of said sloping sidewall forming interruptions thereof, the vertical distance between the bottom of said lugs and a nesting surface of the depression being defined as the bottom stacking height, and said top stacking height being substantially equal to said bottom stacking height.

*7. A nestable container comprising a bottom wall, a circumferential sidewall extending upwardly and generally inclined outwardly from said bottom wall and ending in a peripheral rim at its upper extent, and a combined stacking ridge and lid receiving area including said rim and the portion of said sidewall extending downwardly therefrom, said stacking ridge and lid receiving area comprising a shoulder adjacent the upper end of said container and extending generally horizontally outwardly from the inclined portion of said sidewall to form the lowermost extent of the stacking ridge portion of said area, a face section inclined and projecting inwardly and upwardly from said shoulder, and extending a shelf extending outwardly and upwardly from the upper extent of said face section and spaced downwardly from the top of said rim, the vertical distance between said shoulder and said shelf being defined as the top stacking height, the outer extent of said shoulder being greater than the inner extent of said shelf, the outer extent of substantially all portions of said sidewall which are intermediate said shoulder and a point spaced downwardly therefrom a distance equal to said top stacking height being less than the inner extent of said shelf, and the outer extent of all portions at and below said point being less than the inner extent of said shoulder, so that the shoulder of one such container can seat on the shelf of a next lower like container to provide a stacking means between two such containers when nested together, the distance between said shelf and the top of said rim being less than said top stacking height and the outer periphery of said shelf being joined to said rim with all portions of the inner surface of said sidewall between said shelf and the top of said rim being disposed at least as far outwardly as said outer periphery of the shelf, said shelf and at least the upper portion of said face section below said shelf forming a lid sealing means of said area.*

*8. The container of claim 7 wherein a generally vertically disposed circumferential portion is located between said shoulder and said face section connecting them together.*

*9. A nestable container according to claim 7 wherein an upwardly extending wall portion is located between said shelf and said rim connecting them together.*

*10. A nestable container comprising a bottom wall, a circumferential sidewall extending upwardly and generally*

*inclined outwardly from said bottom wall and ending in a peripheral rim at its upper extent forming an open end of said container, said sidewall adjacent to said open end of the container being provided with a peripherally continuous outwardly extending first shoulder presenting a sharply defined outer edge forming a stacking ridge, a substantially vertical neck extending upwardly from said first shoulder and having at its upper end an inwardly projecting bead and a peripherally continuous outwardly extending second shoulder formed by the upwardly facing surface of said bead, said inwardly projecting bead presenting a sharply defined inner edge of said second shoulder, the vertical distance between the first shoulder and the second shoulder being defined as the top stacking height and the vertical distance between said second shoulder and the top of said rim being less than said top stacking height, the outer diameter of said first shoulder being greater than the diameter of said inner edge of the second shoulder, the outer diameter of said second shoulder being greater than said outer diameter of the first shoulder, the outer extent of substantially all portions of said sidewall which are intermediate said first shoulder and a point spaced downwardly therefrom a distance equal to said top stacking height being less than the diameter of said inner edge of said second shoulder, and the outer extent of all portions at and below said point being less than the inner diameter of said first shoulder, so that said first shoulder of one such container can seat on said second shoulder of a like container therebelow when the two containers are nested together, and a portion extending upwardly from the outer extent of said second shoulder to said peripheral rim, said portion at all locations therealong having an inner diameter which is at least as great as the outer diameter of said second shoulder, said second shoulder and said inwardly projecting bead forming a lid sealing means.*

* * * * *

UNITED STATES PATENT AND TRADEMARK OFFICE

CERTIFICATE OF CORRECTION

PATENT NO. : Re. 29,320

DATED : July 26, 1977

INVENTOR(S) : Daniel R. Kalata and Henry H. Huston

It is certified that error appears in the above-identified patent and that said Letters Patent are hereby corrected as shown below:

Column 2, line 19, after "care" and before "shipment", insert --during--;

line 68, change reference numeral "12" to --22--.

Column 6, line 37, after "and" (second occurrence) and before "upwardly", insert --extending--;

line 38, after "and" (first occurrence) and before "a", delete "extending".

Signed and Sealed this

First Day of November 1977

[SEAL]

*Attest:*

RUTH C. MASON
*Attesting Officer*

LUTRELLE F. PARKER
*Acting Commissioner of Patents and Trademarks*